United States Patent
Uyeda et al.

(10) Patent No.: US 11,447,297 B2
(45) Date of Patent: Sep. 20, 2022

(54) PACKAGING WITH RADIO-FREQUENCY AUTHENTICATION SYSTEM FOR PACKAGED PRODUCT

(71) Applicant: Apple Inc., Cupertino, CA (US)

(72) Inventors: Mark T. Uyeda, Campbell, CA (US); Katherine O. Krajewski, Sausalito, CA (US)

(73) Assignee: Apple Inc., Cupertino, CA (US)

( * ) Notice: Subject to any disclaimer, the term of this patent is extended or adjusted under 35 U.S.C. 154(b) by 79 days.

(21) Appl. No.: 17/022,339

(22) Filed: Sep. 16, 2020

(65) Prior Publication Data

US 2020/0407113 A1  Dec. 31, 2020

Related U.S. Application Data

(63) Continuation of application No. 16/354,730, filed on Mar. 15, 2019, now Pat. No. 10,807,766.

(51) Int. Cl.
  *B65D 23/14* (2006.01)
  *B65D 79/00* (2006.01)
  *G06K 7/10* (2006.01)
  *H01Q 1/22* (2006.01)

(52) U.S. Cl.
  CPC ............ *B65D 23/14* (2013.01); *B65D 79/00* (2013.01); *G06K 7/10297* (2013.01); *H01Q 1/2216* (2013.01)

(58) Field of Classification Search
  CPC ........ B65D 23/14; B65D 79/00; B65D 27/14; B65D 2203/10; B65D 27/30; B65D 27/38; G06K 7/10297; G06K 19/07345; H01Q 1/2216; G06F 21/44; G06F 21/34; G06Q 20/354
  See application file for complete search history.

(56) References Cited

U.S. PATENT DOCUMENTS

| | | | |
|---|---|---|---|
| 5,842,629 | A | 12/1998 | Sprague |
| 7,098,794 | B2 | 8/2006 | Lindsay |
| 8,295,811 | B1 | 10/2012 | Gailloux et al. |
| 9,796,162 | B2 | 10/2017 | Thorogood |
| 10,262,319 | B1 | 4/2019 | Benkreira |
| 2001/0054755 | A1 | 12/2001 | Kirkham |

(Continued)

FOREIGN PATENT DOCUMENTS

| CN | 1701344 A | 11/2005 |
|---|---|---|
| CN | 203078858 U | 7/2013 |

(Continued)

OTHER PUBLICATIONS

Dhokia, Kavi: "Tap to Activate Your Debit Card", Nov. 14, 2017, XP002798914; https://monzo.com/blog/2017/11/14/nfc-card-activation#article.

(Continued)

*Primary Examiner* — Ryan W Sherwin
(74) *Attorney, Agent, or Firm* — Sterne, Kessler, Goldstein & Fox P.L.L.C.

(57) ABSTRACT

A product with packaging includes an envelope having a cavity. An NFC chip may be embedded in the packaging. The NFC chip may be passive, and may connect to the electronic device of the specific user, and once connected may initiate or carry out an authentication process or activation process.

11 Claims, 7 Drawing Sheets

(56) References Cited

U.S. PATENT DOCUMENTS

| | | | |
|---|---|---|---|
| 2002/0088855 A1* | 7/2002 | Hodes | B65D 73/0028 |
| | | | 235/385 |
| 2005/0171898 A1 | 8/2005 | Bishop | |
| 2007/0013521 A1 | 1/2007 | Lindsay | |
| 2007/0040683 A1 | 2/2007 | Oliver | |
| 2007/0152829 A1 | 7/2007 | Lindsay | |
| 2007/0194945 A1 | 8/2007 | Atkinson | |
| 2007/0290858 A1 | 12/2007 | Janke | |
| 2009/0193500 A1 | 7/2009 | Griffin | |
| 2011/0140841 A1 | 6/2011 | Bona | |
| 2012/0225639 A1 | 9/2012 | Gazdzinski | |
| 2012/0298736 A1 | 11/2012 | Haddad | |
| 2014/0138275 A1* | 5/2014 | Magnusson | G06F 1/3215 |
| | | | 455/566 |
| 2016/0314635 A1 | 10/2016 | Chen | |
| 2017/0011287 A1 | 1/2017 | Kapp | |
| 2017/0132565 A1 | 5/2017 | Beadles | |
| 2018/0025349 A1 | 1/2018 | Marsh | |
| 2018/0117944 A1 | 5/2018 | Lee | |
| 2018/0189527 A1 | 7/2018 | Kim | |
| 2019/0130689 A1 | 5/2019 | Baumgarte | |

FOREIGN PATENT DOCUMENTS

| | | |
|---|---|---|
| CN | 107636694 A | 1/2018 |
| ES | 2464873 A2 | 6/2014 |
| KR | 20140101518 A | 8/2014 |
| KR | 20160144101 A | 12/2016 |
| WO | 01/31558 A2 | 5/2001 |
| WO | 2007/096898 A2 | 8/2007 |
| WO | 2020/060766 A1 | 3/2020 |

OTHER PUBLICATIONS

Schilling, J. et al., "Secured Miniaturized System-in-Package Contactless and Passive Authentication Devices featuring NFC," 2016 Euromicro Conference on Digitial System Design (DSD), Limaol, Aug. 2016, pp. 439-445.

Liu, S., et al., "A Security-Enhanced Express Delivery System based on NFC," 2016 13th IEEE International Conference on Solid-State and Integrated Circuit Technology (ICSICT), Hangzhou, Oct. 2016, pp. 1534-1536.

* cited by examiner

PACKAGING WITH RADIO-FREQUENCY AUTHENTICATION SYSTEM FOR PACKAGED PRODUCT

CROSS-REFERENCE TO RELATED APPLICATIONS

This application is a Continuation of U.S. patent application Ser. No. 16/354,730, entitled "PACKAGING WITH RADIO-FREQUENCY AUTHENTICATION SYSTEM FOR PACKAGED PRODUCT," filed on Mar. 15, 2019, the content of which is incorporated herein by reference in its entirety.

FIELD

The described embodiments relate generally to retail packaging. More particularly, the present embodiments relate to "smart" packaging using communication systems such as near field communication ("NFC") in order to provide automatic activation, authentication, etc., when a user opens the packaging.

BACKGROUND

Connected or "smart" packaging may include certain sensors or communication tools to track packages in transit, or provide additional information about a product to a consumer (e.g., through a digital application or visual display). Such tools simply provide information. They do not take part in activation, authentication, etc., of a product when a user opens or receives the packaging.

SUMMARY

Some embodiments include packaging, such as an envelope or box.

As an envelope, the packaging may include an opening or cavity that may contain a product that requires or benefits from activation prior to use (e.g., a gift card, credit card, membership card, or other suitable product). A data chip (e.g., an RFID chip, which may be an NFC chip, etc.) may be embedded within the packaging, or affixed to a surface of the packaging (either interior or exterior), and can be used in conjunction with a user's personal electronic device to activate the product contained in the packaging.

In the case of a passive data chip (e.g., one that is temporarily powered as needed wirelessly by another device in proximity to the chip) such as a passive NFC chip, for example, if a user's personal electronic device such as a mobile phone with an NFC transceiver is within range, the electronic device may recognize the NFC chip, and initialize the authentication or activation of the product via the electronic device automatically. Advantageously, no outward searching function (e.g., of an active NFC chip) is needed.

The packaging may be formed of different materials than the product (e.g., the packaging may be formed of a cellulose-based material and the product may be formed of or include a plastic and/or metallic material). For example, the packaging may be made entirely from recyclable material, for example from paper, molded fiber, corrugated cardboard, etc. In some embodiments, all or some of the packaging may be made from polymeric materials. In any event, the packaging may be formed from radio-transmissive materials. The packaging may include additional space to receive a second product that does not require authentication or activation.

In some embodiments, the packaging may take the form of an envelope, particularly composed of layered panels. Within the stack-up of the layered panels, a receiving passage may be formed such that the data chip is concealed flatly within a panel of the packaging. This provides protection for the chip, aesthetic relief in the panel, and—in the case of a card product for example—provides for a smooth insertion of the product along a flat plane of the envelope. An additional shipping package may be provided (such as a corrugated paper envelope having a tear-strip) that the finished goods package (e.g., the envelope) is shipped to an end user in to protect the finished goods package.

Advantageously, this improves upon prior systems having, for example, manual authentication or activation that may provide a more difficult customer experience. In contrast to prior systems that require a user to manually telephone an activation line, or manually navigate to a website, the customer experience is improved by removing those impediments to authentication or activation. By designing smart, connected packaging that automatically authenticates or activates a packaged product with minimal impact to the user, efficiency is improved along with the user experience.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Product packaging is an integral part of a customer's experience. It introduces the customer to their product, and can affect the customer's feelings toward the product and the company that created it. Seamless packaging that allows for an individual to automatically authenticate or activate products—removing any barriers to their use—may be particularly desirable.

In the same vein, companies may be sensitive to the cost of packaging and may wish to promote packaging that is eco-friendly. Certain packaging materials are higher cost due to their processing, and while engineers may be able to design single-component packaging, the cost may be prohibitive for certain materials. Optimization of packaging in material usage may help keep costs low, and if done well may not interfere with, and may promote, a positive user experience. Packaging made out of recyclable and/or biodegradable materials, such as paper or other cellulose-based products, can reduce environmental impact. Packaging that is interesting in character and that enhances a user's initial experience with the product that it contains may boost a product's or a brand's reputation, thereby attracting new customers and retaining previous customers.

Packaging described in this document achieves these and other beneficial characteristics by balancing smart connectivity and efficiency, structural robustness, eco-friendly materials, and aesthetic elements.

The packaging may be retail packaging (i.e., finished packaging for containing and conveying a product to a user such as may be used in a retail setting or a finished goods package that may be shipped to a customer within an outer shipping package) that one may expect to find on the shelf in a retail store, and which one may open after purchase to directly access their product. A product contained by the packaging may be, for example, a credit card, gift card, membership card or the like; or an electronic device such as, for example, a laptop, tablet computer, or smartphone.

The packaged product may be desirable to authenticate, or it may require activation (e.g., a credit card or a gift card). Authentication or activation may be initiated by an authorized user. The packaging may include electronics such as an NFC chip that may communicate with the user's electronic device in order to carry out the authentication or activation function. For example, some of the required electronics to communicate with electronic device for authentication or activation may be housed within the packaging and not the product. Advantageously, this allows for added space and efficiency within the product such that electronics that are only used for authentication are not contained within the product. This is especially beneficial for products with small design footprints, or if a product requires a one-time-only activation or authentication.

These and other embodiments are discussed below with reference to the accompanying figures. However, those skilled in the art will readily appreciate that the detailed description given herein with respect to these figures is for explanatory purposes only and should not be construed as limiting.

Figure 1:
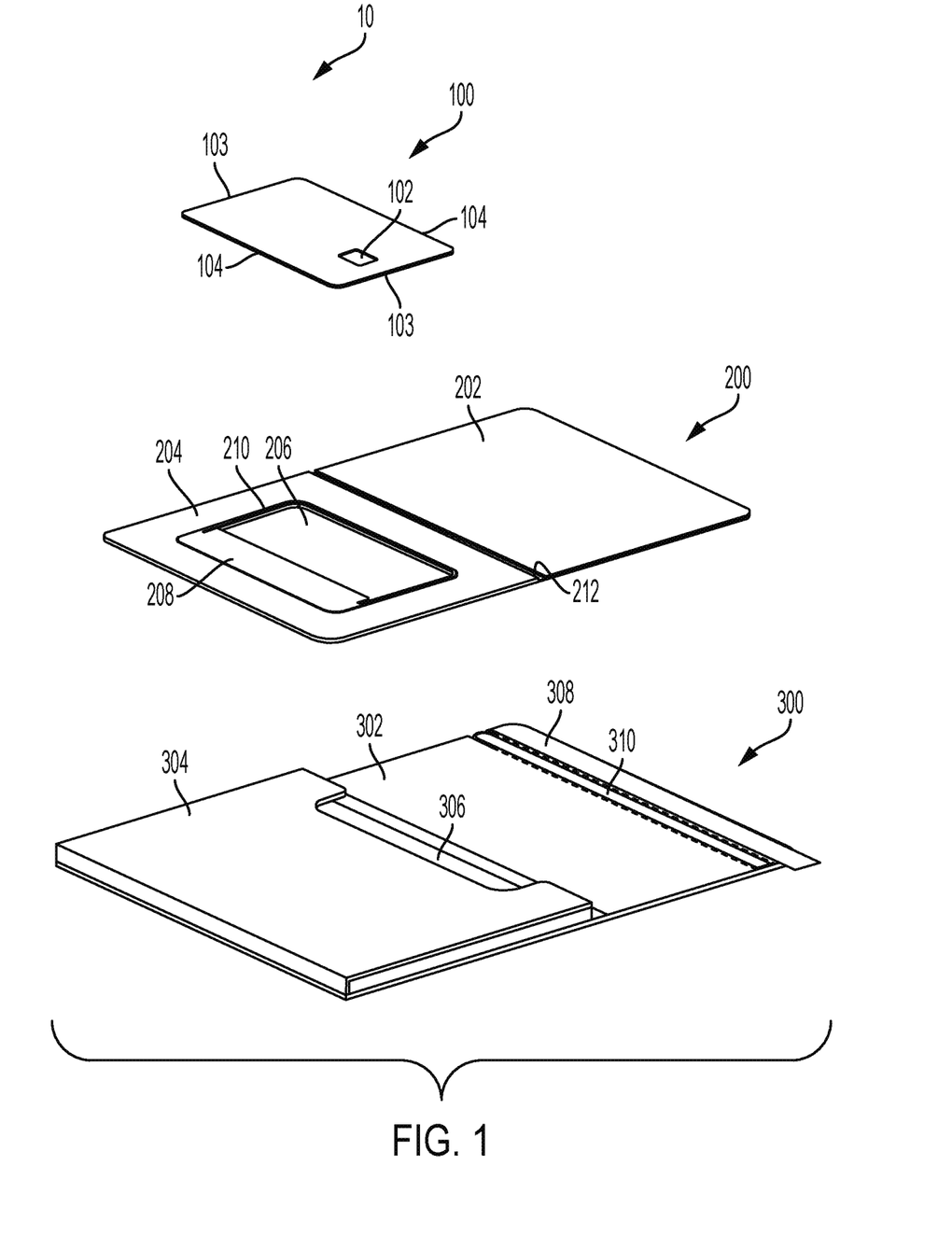
FIG. 1 shows a packaging system with a card product.
Figure 2:
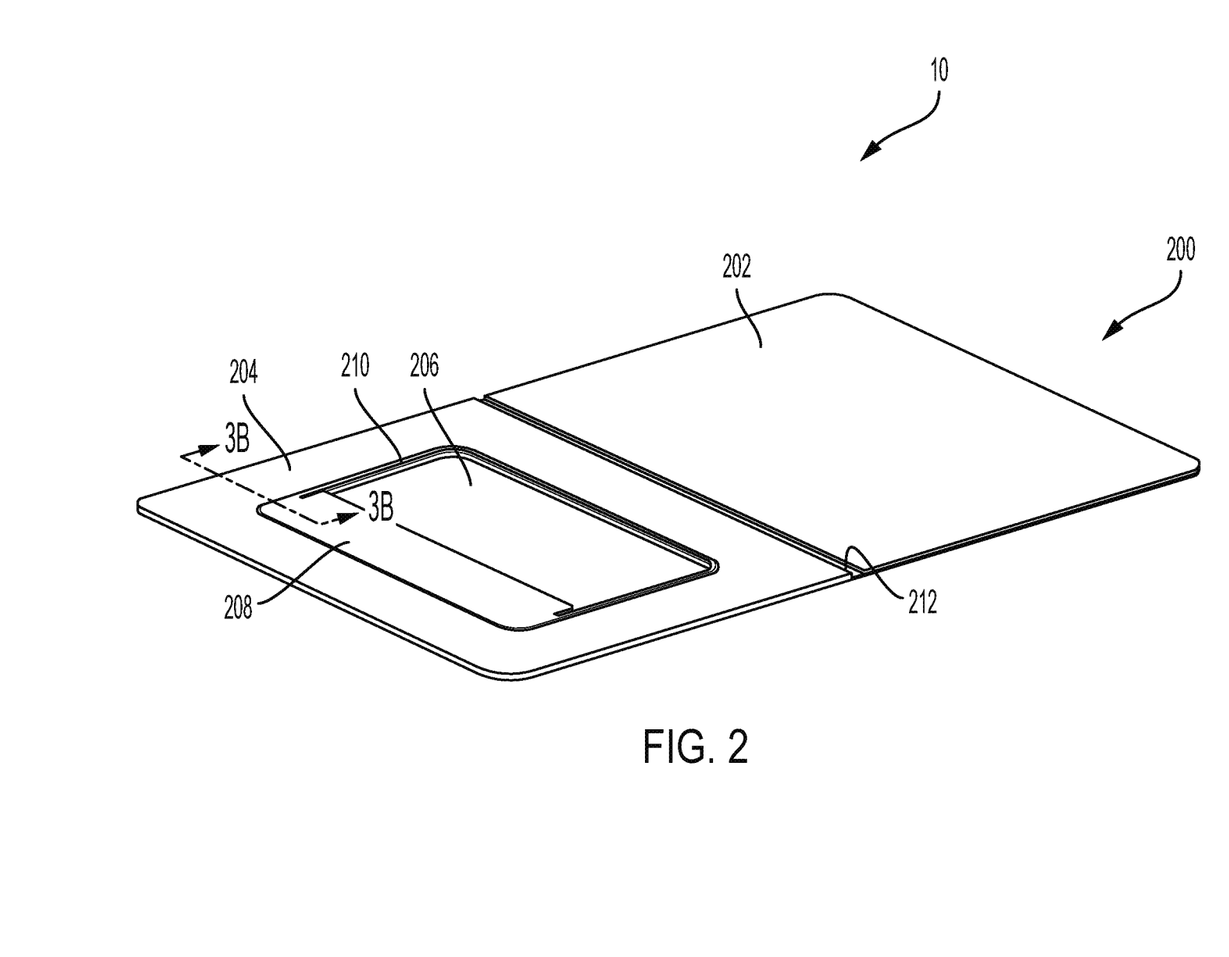
FIG. 2 shows a finished goods package in the form of an envelope as shown in FIG. 1.

FIG. 1 shows a schematic illustration of packaging system 10 including product 100, finished goods packaging 200, and shipping package 300. In FIGS. 1 and 2 packaging 200 is shown as a bi-fold envelope configuration, and includes authentication electronics such as a data chip 214 (shown in FIG. 3A in an exploded view), for example a passive data chip 214. Data chip 214 may be a data tag that includes a chip portion and an antenna portion. Product 100 may be a card product such as a credit card. Product 100 may include longitudinal surfaces 104 and transverse surfaces 103 defining the general perimeter of the planar surface of the card product. Product 100 may include an additional chip 102 that is not used in authentication or activation of the product—instead it may be tied to an account such that the card product may be used, for example, for drawing credit against a user's account in a credit and/or banking system.

As will be appreciated with reference to the figures, product 100 may be inserted into receiving portion 206 of packaging 200. Retaining panel 208 may extend over receiving portion 206 product 100 to help retain product 100 when product 100 is disposed inside a pocket formed by a lower surface of receiving portion 206. The embossed edge 210 may similarly engage product 100 when product 100 is disposed in packaging 200. As shown in FIG. 2 for example, packaging 200 may generally have a bi-fold configuration having first panel 204 where product 100 is retained. Packaging 200 may fold about folding portion 212 to be closed by the opposing second panel 202.

Figure 4A:
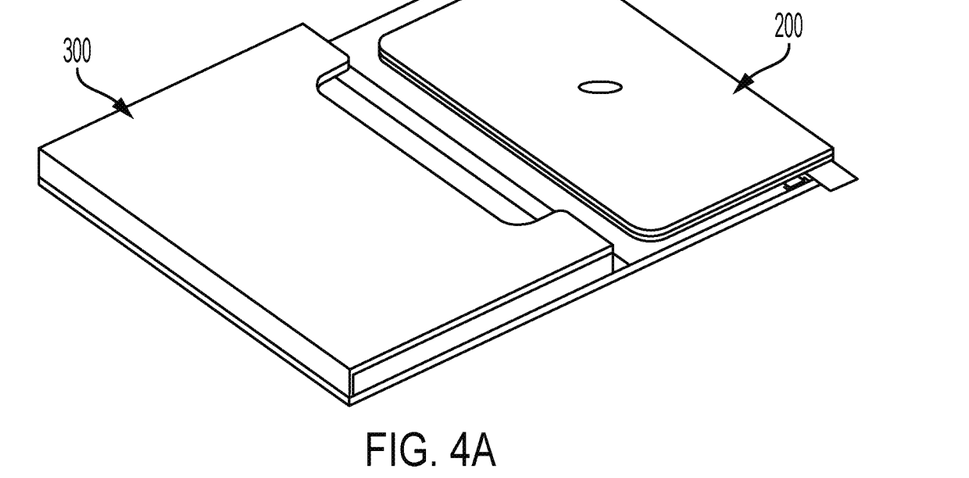
FIG. 4A shows an open configuration of the packaging system with the envelope being placed into a shipping package.
Figure 4B:
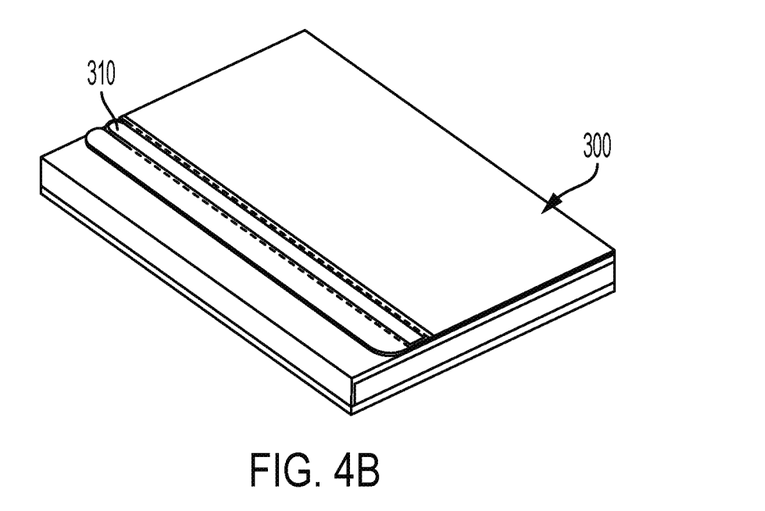
FIG. 4B shows a closed configuration showing the shipping package being closed.

In turn, shipping package 300 may receive packaging 200 in receiving portion 306, sized to snugly hold packaging 200 therein (see FIGS. 4A and 4B, for example). A panel 302 of shipping package 300 may fold over and close on a panel 304 of shipping package 300, being attached by an adhesive 308, such as an adhesive strip, hot melt glue, or the like. When closed, a tear strip 310 may be removed by the user to open panel 302 and remove packaging 200.

Figure 3A:
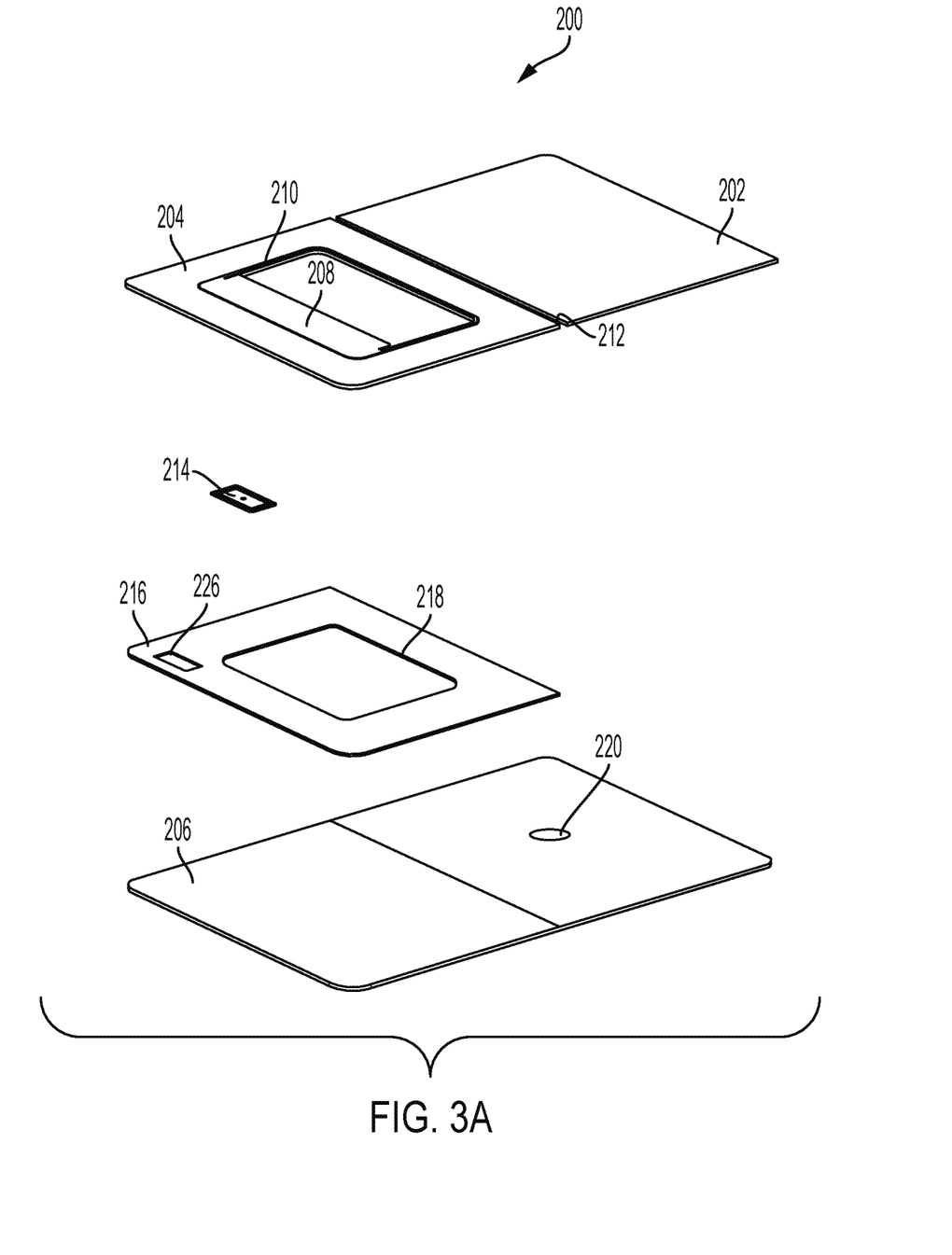
FIG. 3A shows an exploded view of the finished goods package shown in FIG. 2.
Figure 3B:
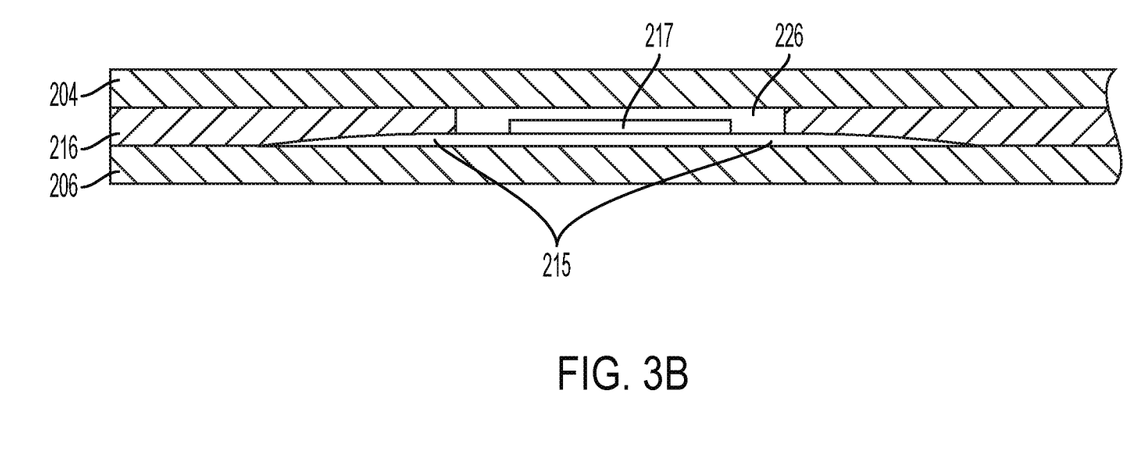
FIG. 3B shows a cross-sectional schematic view taken along line 3B-3B of FIG. 2.

Returning to FIG. 3A, an exploded view of packaging 200 is shown. In some embodiments, packaging 200 includes a plurality of layers laminated together (e.g., using high-frequency welding of a coating between paper panels. As shown in FIGS. 3A and 3B, packaging 200, packaging 200 may be configured as an upper panel including a surface of opposing second panel 202 first panel 204, and retaining panel 208. Frame panel 216 may "sandwich" at least a portion of a data chip 214 between the frame panel 216 and an opposite surface of first panel 204 (e.g., antenna 215 of chip 214 may be so sandwiched). In turn, frame panel 216 is "sandwiched" by the opposing surface of first panel 204 and the panel making up the lower surface of receiving portion 206. In this way, panel 204 and portion 206 may be bonded to panel 216. Additionally, panel 202 and panel 220 are also bonded together. Internal perimeter 218 may define an opening and coact with the lower panel to serve as a receiving portion. The placement shown in the FIGS. of data chip 214 is not limiting, and it may be disposed in various acceptable places, e.g., towards the center of the envelope, an upper portion, or other suitable space for its disposal.

In some embodiments, a pocket, slot, opening, or other relief feature 226 may receive at least a portion of data chip 214 in between panels 204 and portion 206. This achieves two goals—protecting data chip 214, and also keeping a flat configuration such that neither panel 204 nor portion 206 includes any bulge or protrusion showing the underlying data chip 214. In some embodiments, relief feature 226 may be in one or more of the panels, and the location of the same is flexible. The chip portion 217 of data chip 214 may have a thickness greater than a thickness of antenna 215, which may be essentially flat such that it may be laminated directly between two adjacent panels. Data chip 214 may be affixed to one or more of the panels, e.g., through an adhesive, polyethylene backer, or other securing means. In some embodiments, antenna 215 may be, for example, a conductive metal trace such as copper, aluminum, silver, etc. In some embodiments, data chip 214 (e.g., an NFC chip) or its antenna may be directly printed on a paper or other cellulose substrate, such as one of the panels (e.g., in copper, silver, aluminum, or other metallic traces as an ink).

In some embodiments, data chip 214 is passive (e.g., a passive NFC chip), and does not require receiving data to operate as intended. It can be energized (e.g., powered) wirelessly from a device in close proximity to it (e.g., a personal electronic device with an NFC reader), which can then receive data from data chip 214. Additionally, other modes of powering on and activating data chip 214 are contemplated, for example interacting with a particular feature of the packaging. While discussed generally with the relation to NFC technology, other modes of data and energy transmission are contemplated, such as different radio frequency (RF) schemes like RFID, Bluetooth, acoustic, Wi-Fi, or other modes of data and energy transmission. In some embodiments, the data/energy transmission may not require a power source. In other embodiments, the packaging may include an active data chip (e.g., an active NFC chip) that includes a data chip and power source (e.g., a battery such as a micro-battery). When the packaging is opened, the data chip may be powered on and begin searching for an electronic device to carry out an authentication function, an activation function, or the like. Additional details of such systems may be found in U.S. App. 62/732,740, filed Sep. 18, 2018, incorporated herein by reference in its entirety for all purposes.

Packaging 200 or shipping package 300 may be made from radio-transmissive materials, for example cellulose-based materials, wood materials, nonmetallic polymer materials, etc. By using radio transmissive materials for packaging 200, communication from data chip 214 is made easier (especially, for example, if a product 100 is made from metallic materials, such as a metal card shaped product, such as a credit card). In some embodiments, (e.g., where packaging 200 may include less relatively radio transmissive materials or non-radio transmissive materials) packaging 200 may be provided with a radiofrequency (RF) transparent feature, such as an aperture or antenna window such that data chip 214 may communicate through packaging 200.

As previously discussed, the packaging components may be composed of a recyclable material (e.g., a biodegradable or compostable material). If and when the customer opts to dispose of the packaging, because the packaging is recyclable or cellulose-based, the packaging may simply be recycled without requiring material separation (e.g., in a single-stream recycling program). In some embodiments, any electronics associated with packaging system 10 may be removed from the packaging prior to recycling.

Returning to the automatic activation and authentication features, in some embodiments, data chip 214 may be preprogrammed to allow the initiation of activation authentication processes only when certain criteria are met (e.g., initiation is triggered by a particular target user).

For example, a user may order a new credit card from a company. The company may prepare a credit card (product 100; see, e.g., FIG. 5) for that particular user. The credit card may be packaged within packaging 200 including data chip 214. At this point the credit card is not active, and cannot be used. Data chip 214 may be preprogrammed with data representing at least identification information for the particular card contained within the packaging, destined for the particular user. The data on data chip 214 may be encrypted or otherwise protected such that its information is not discoverable by unauthorized users.

The user's personal electronic device 40 may already be associated with the user's unique account (e.g., from the user's prior use of or access to the account using their personal electronic device). When the user receives their credit card packaged within packaging 200, the user may bring their personal electronic device 40 within the range of a data chip reader of their personal electronic device. When data chip 214 is within such range, it may send the data representing identification information for the particular card to the personal electronic device 40. The personal electronic device may communicate with a remote server of the company to determine if the unique account on the user's personal electronic device 40 matches an account of the intended recipient of the credit card. If so, server may activate the credit card (or send a signal to the personal electronic device that initiates an activation process on the device). Otherwise, activation of the credit card will not occur, and an activation process will not be initiated.

In some embodiments, data chip 214 may be preprogrammed with data representing at least two pieces of information: (1) identification information for the particular card contained within the packaging, destined for the particular user; and (2) identification information for an account of the particular user. The latter information can be used to serve a gateway function, e.g., causing another step to trigger on device 40 such as a user interface displaying options for authentication and activation. In some embodiments, there may be a visual indicator on the packaging 200 such as an icon to indicate active packaging functionality. In some embodiments the visual indicator may include instructions, such as "To activate, wake device and hold below." The visual indicator may be proximate or on top of where data chip 214 is located such that the user will be prompted to bring the packaging proximate the electronic device. When data chip 214 is brought within range of a personal electronic device 40, data chip 214 may send to electronic device 40 only the identification information for the account of the particular user. If this account information does not match or otherwise correspond acceptably to account information associated with the electronic device 40 (as determined either by data chip 214 or by electronic device 40 itself), activation of the credit card will not occur, and an activation process will not be initiated. In some embodiments, a second authentication may be required either before, after, or in parallel to the first authentication using a data chip. For example, a biometric recognition step may be required as a second authentication, e.g., a fingerprint authentication, facial recognition authentication, voice authentication, or other biometric authentication may be required in order for the product to be activated or authenticated.

More specifically, in a passive system, the an NFC chip acts as a type of signal signpost, such that no active reception or signal searching is required; it only broadcasts outward to electronic devices having NFC receivers. So when data chip 214 is associated with a particular target user account, if a device not associated with a specific user is brought near a receiver that does not belong to that specific user, either no action will be taken, or a generic action will be taken (e.g., opening a generic product website, for example, or alerting the company or individual that a non-target user has brought the data chip 214 within a non-target receiver's range).

Figure 5:
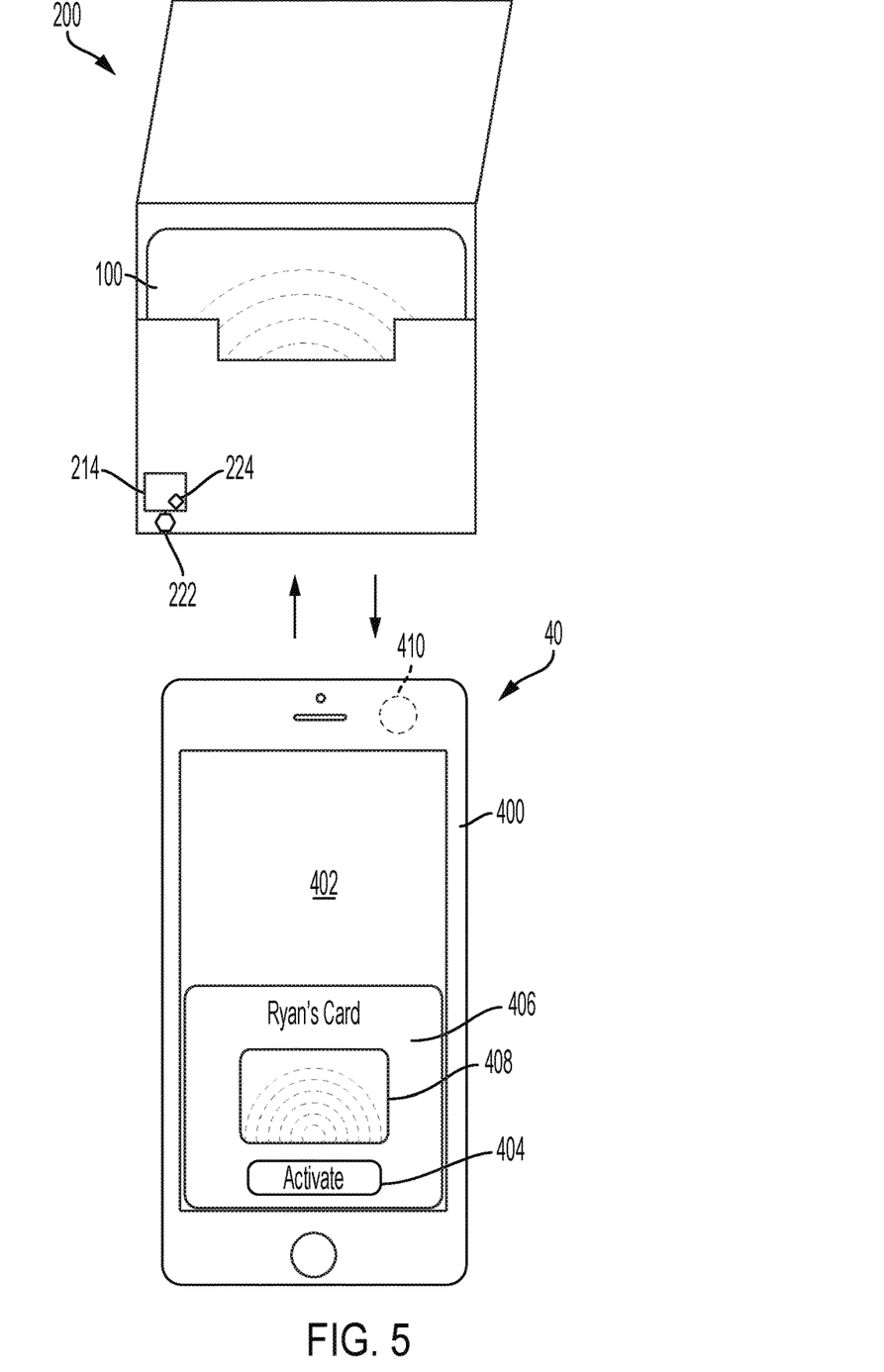
FIG. 5 shows a schematic illustration of a packaging and an electronic device shown in, with the packaging being opened and the data chip communicating with the electronic device.
Figure 6:
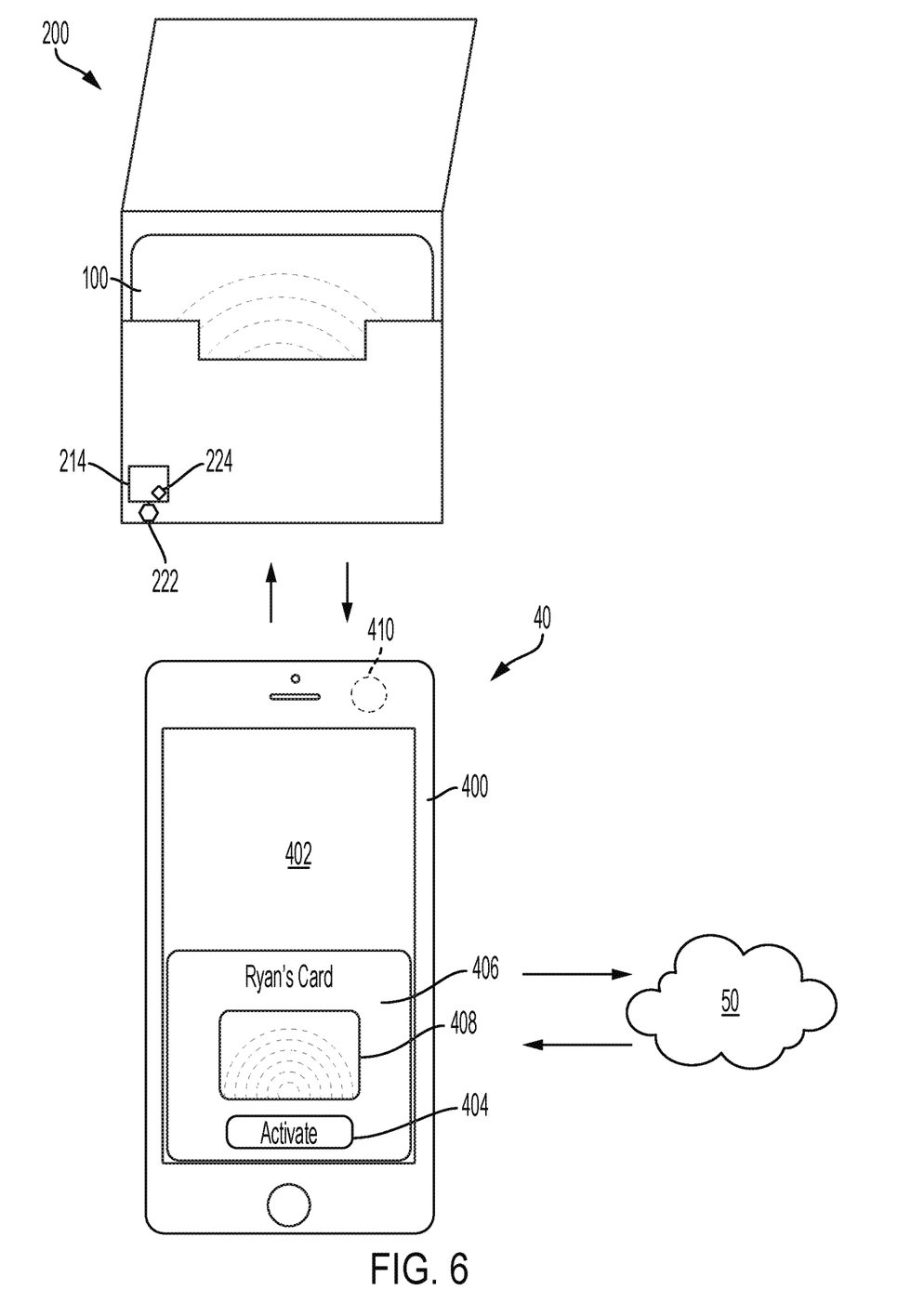
FIG. 6 shows a schematic illustration of the packaging and electronic device shown in, with the packaging being opened and the data chip communicating with the electronic device, and electronic device communicating with a server.

Turning to FIGS. 5 and 6, in some embodiments, data chip 214 may be preprogrammed to begin activation or authentication processes on any electronic device that is associated with a user account that is in turn associated with a purchase of a product of the particular type contained within packaging 200 (which product 100 may be awaiting activation or authentication). If a product is fungible but still requires activation, e.g., in the case of a cash card, this allows data chip 214 to identify a corresponding electronic device 40 that belongs to a person that has a verified order for the fungible product. In this way, electronic device 40 may interface with a company's (e.g., the seller of the product) logistics platform, such that information about product 100 may be shared with an appropriate electronic device 40. Once the product 100 is authenticated or activated, electronic device 40 may communicate with the logistics platform to inform the company that the order is complete. Similarly, in an active chip configuration, electronic device 40 may communicate to an active data chip 214 and disable any further attempts at activation or authentication.

In the case of a non-fungible product, e.g., such as a credit card for a particular target user that requires activation, data chip 214 may broadcast a signal specific to the account associated with the card, or the user associated with the card, for example. In this way, electronic device 40 that receives the signal may communicate or interface with a company's (e.g., the seller of the product) logistics platform, such that information about product 100 may be shared with an only an appropriate electronic device 40 tied to the target user of the card. Once the product 100 is authenticated or activated, electronic device 40 may communicate with the logistics platform to inform the company that the order is complete. If the data chip is active, rather than passive, electronic device 40 may communicate to data chip 214 and disable any further attempts at activation or authentication.

Electronic device 40—for example a user's mobile phone, tablet, smart watch, laptop, desktop, etc.—includes a body 400 that may house electronics of electronic device 40, and generally may include a screen 402, for example a touch-screen (or other user interface). For certain products, such as a credit card, activation and authentication would previously have been accomplished by manually calling a telephone number, manually navigating to and typing in information at website, or via an application-based process where the user manually authenticates themselves in some manner and then confirms the card is in their possession. The user may be prompted to start this process by following instructions written on a sticker applied to the credit card. While manual authentication options such as one of these that would allow for other modes of activation or authentication may be useful and may be included in some embodiments as a fallback option, FIGS. 5 and 6 shows an example of how this manual process is initially avoided.

In some embodiments, if the packaging system 10 or packaging 200 is in an unopened state, it may be such that no automatic activation or authentication has been or will be performed with reference to any product contained within packaging system 10—e.g., by disabling data chip 214. However, in the case of a passive data chip configured to produce at least two functions at different electronic devices (i.e., target and non-target devices), no such disabling is necessary as the chip is already effectively disabled when brought proximate a non-target electronic device.

FIG. 5 shows a schematic illustration of packaging 200 (with product 100) and electronic device 40. Data chip 214 of packaging 200 is shown communicating with electronic device 40, for example through an NFC transceiver 410 in electronic device 40 that may serve as a reader and a transmitter. This communication may be bidirectional, as indicated by the arrows shown between packaging 200 and electronic device 40, or may be in one direction from data chip 214 to transceiver 410. With reference to packaging 200, with envelope flap panel 202 open a product 100 may be revealed within the envelope's cavity (e.g., receiving portion 206). As described, product 100 may be a type of card, for example a credit card, debit card, gift card, membership card, etc. The target user, for example purchaser of the product 100, then may remove product 100 from packaging 200.

As shown in FIG. 5, screen 402 of electronic device 40 may display a graphical user interface 406 when data chip 214 communicates to electronic device 40 through NFC transceiver 410. Graphical user interface 406 may include, for example text information about product 100, for example a description of the product, serial number or identification number, or other useful information to the user. In some embodiments, graphical user interface 406 may include an image 408 representing the product, as shown in FIG. 5. A user may interact with graphical user interface 406 by touching, tapping, swiping, etc. on screen 402. Screen 402 may display other images or information about product 100, or may virtually zoom-in, zoom-out, translate, or rotate the image 408 of the product virtually in three dimensions as displayed on screen 402. Graphical user interface 406 may also include user interface activation element 404, for example an on-screen button that may be interfaced with by the user.

User interface activation element 404 may execute a function, for example to initiate activation or authentication of product 100 via electronic device 40. In some embodiments, no further interaction by a user would be required to activate their product. From the user's perspective activation would be completed simply by opening the packaging and tapping the activate button on their smartphone. In the case of a non-target user device interacting with packaging 200, the activation element 404 may be grayed out, or not available for selection. In some embodiments, graphical user interface 406 may be different, or completely absent if a non-target user device attempts to activate product 100.

While the figures generally show packaging 200 as an envelope configuration, with activation data chip 214 embedded between panels of the envelope, this configuration may take a different form, for example as attached to the outside of packaging 200, or embedded in or attached to a pull-tab, tear-strip, a lid, or other removable or destructible component of packaging 200. In any event, data chip 214 may power on (such as through a micro battery 224, which may be excluded in a passive chip), or may be activated by the electromagnetic field of the electronic device 40 or its NFC transceiver 410. In this way—by containing a power source and data chip within packaging 200 or utilizing an external electronic device's own energy to power the data chip—instead of integrating a separate power source or data chip on a card product for example, challenges regarding constructing additional electronics within the card, including added size and weight from the additional electronics, etc., may be avoided. In some embodiments, if a separate power source is included, such as a micro-battery, it may contain enough energy (i.e., battery life) for an expected duration from when the packaging 200 containing product 100 is shipped to when a target end-user will open packaging 200 and complete the activation process. This is beneficial because it reduces power source complexity and moves relatively large NFC electronics out of a small volume allowance in a particular product 100, such as a card product, and into a large allowable volume within packaging.

Turning to FIG. 6, a schematic illustration of packaging 200 and electronic device 40 is shown, with the packaging 200 being opened and the electronic device 40 communicating with a server 50, such as an external device or network that may include a logistics platform. In some embodiments, electronic device 40 may communicate with server 50 in order to carry out an authentication, activation, or other smart packaging feature. Server 50 may include one or more of a database, server, Internet, network, or cloud-based server features such that product 100 may be authenticated or activated.

As discussed above, data chip 214 broadcasts a signal to electronic device 40, e.g., through a transmitter 222. Data chip 214 may be preprogrammed to begin an activation or authentication process only upon establishing communication with a particular user's electronic device. In some embodiments, this may be achieved by programming information into data chip 214 that may identify electronic information stored in electronic device 40 correlated with a user's identity. This helps prevent data chip 214 from initiating an activation process with a device that does not belong to the particular user for which it is intended. For example, data chip 214 may include an authorized user's user ID, and may only communicate with an electronic device 40 that has a matching user ID (e.g., within an operating system of electronic device 40). Other software, firmware, hardware, etc. may be used. In some embodiments, device or user identity may be provided by a third-party source, such as a web-based application accessed on electronic device 40. In this regard, for data chip 214 to initiate authentication or activation functions, a user may be required to access such an application in order for device or user identification to proceed.

The packaging is constructed to give a clean, unitary appearance. This helps to reinforce its high quality and robust character, and that of the product 100. To achieve this appearance, seams, gaps, and distortions in shape are minimized. The packaging may be a particular color, e.g., a brand-identifier color. In some embodiments, visible surfaces of packaging may be predominantly white.

Components of the packaging may be formed from one or more blanks. In some embodiments, the blank is formed of a single continuous substrate, such as, for example cellulose-based material like cardboard or paperboard. In some embodiments, interior surfaces of the packaging may be surface treated or coated, for example with a coating to protect the finished product. Tabs, flaps, and regions without adhesive of the blank are formed such that no adhesive is visible in finished packaging. In some embodiments, adhesive may be omitted and the various flaps and tabs attached in another suitable manner (e.g., by mechanical interlock or press fit). Fold lines may be formed, for example, by weakening the substrate along the lines, such as by perforation, material crushing, scoring, miter cutting, etc.

In some embodiments, any surface finishing may take place after the components are cut from the blank, or alternatively prior to the blank being cut into separate sheets for assembling to a final package. Additionally, some operations may be performed concurrently.

Alternatively, some or all of the components described as being formed of cellulose-based material, such as cellulose fiber material like paper, may instead be formed of a polymeric material, or coated in a material such that they may be laminated together or otherwise adhered to each other. Suitable polymeric materials include, but are not limited to, polyethylene, polypropylene, polyurethane, polystyrene, polymer blends including one or more of these polymers, or co-polymers including one or more of these polymers. All or some of the surfaces of the packaging may be coated, or laminated, which may increase structural strength properties such as rigidity and which may protect a product within the packaging, or avoid scratching.

Additionally, the packaging may be manufactured in a cost-effective and environmentally-friendly way. In some embodiments, the packaging components may be constructed of a single integrally-formed piece of material. The single integrally-formed piece of material may be a foldable material that is folded into a configuration that holds and secures a product, either alone or within a cavity of a packaging container. In some embodiments, the foldable material may be a single piece of material that is cut by a single operation (e.g., a single die-cutting operation). In some embodiments, the foldable material may be die cut from a stock material (e.g., a sheet or roll of material). Single integrally-formed pieces of material that are cut by a single cutting operation may facilitate efficient and reproducible manufacturing. Moreover, such manufacturing may reduce waste by reducing waste material during manufacturing.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A packaged product, comprising:
   a product; and
   finished goods packaging for the product, comprising:
      a data chip, wherein the data chip includes data that is uniquely associated with the product,
   wherein the data chip is configured to transmit the data to a personal mobile device that is associated with a user account, upon the data chip being brought within range of a data reader of the personal mobile device,
   wherein after the finished goods packaging is opened, the data chip is configured to:
      automatically power on;
      search for the personal mobile device that is associated with the user account;
      based on finding the personal mobile device based on the transmitted data, initiate an authentication or activation process; and
      upon completion of the authentication or activation process, automatically power off, and
   wherein the data chip receives instructions from the personal mobile device to disable any further authentication or activation process once an initial authentication or activation process has concluded.

2. The packaged product of claim 1, wherein the data chip is activated upon receiving an interaction with the finished goods packaging.

3. A packaged product system, comprising:
   a product that requires authentication or activation for use as intended;
   finished goods packaging, comprising:
      a data chip separate from the product, wherein the data chip includes data that is uniquely associated with the product and with a target user account; and
   a personal mobile device that is associated with the target user account, comprising:
      a user interface, wherein upon the personal mobile device receiving the data from the data chip upon the data chip being brought within range of a data reader of the personal mobile device, the user interface displays an option to initiate an authentication or activation process for the product, and wherein the user interface presents a visual indicator to bring the personal mobile device within a range of the data chip and, once within the range, a user interface activation element is presented to accept input in order to initiate the authentication or activation process for the product.

4. The packaged product system of claim 3, wherein, upon the data chip being brought within the range of the data reader of the personal mobile device, the user interface is triggered to automatically present on the personal mobile device.

5. The packaged product system of claim 3, wherein the user interface displays a user interface activation element and, upon receiving input at the user interface activation element, the personal mobile device begins the authentication or activation process for the product.

6. The packaged product system of claim 3, wherein when the personal mobile device is outside the range, a user interface activation element is disabled from accepting input to initiate the authentication or activation process for the product.

7. The packaged product system of claim 3, wherein the finished goods packaging includes a receiving portion with a relief feature within multiple panels, and the data chip is disposed within the relief feature such that the multiple panels lay in a flat configuration.

8. A packaged product system, comprising:
    a product that requires authentication or activation for use as intended;
    finished goods packaging, comprising:
        a data chip separate from the product, wherein the data chip includes data that is uniquely associated with the product and with a target user account; and
    a personal mobile device that is associated with the target user account, comprising:
        a user interface, wherein upon the personal mobile device receiving the data from the data chip upon the data chip being brought within range of a data reader of the personal mobile device, the user interface displays an option to initiate an authentication or activation process for the product, and wherein the user interface presents a visual indicator to bring the personal mobile device within a range of the data chip and, when the personal mobile device is outside the range, a user interface activation element is disabled from accepting input to initiate the authentication or activation process for the product.

9. The packaged product system of claim 8, wherein, upon the data chip being brought within the range of the data reader of the personal mobile device, the user interface is triggered to automatically present on the personal mobile device.

10. The packaged product system of claim 8, wherein the user interface displays a user interface activation element and, upon receiving input at the user interface activation element, the personal mobile device begins the authentication or activation process for the product.

11. The packaged product system of claim 8, wherein the finished goods packaging includes a receiving portion with a relief feature within multiple panels, and the data chip is disposed within the relief feature such that the multiple panels lay in a flat configuration.

* * * * *